May 10, 1955
C. L. DAY
2,708,250
TUBE ASSEMBLY
Filed June 5, 1952
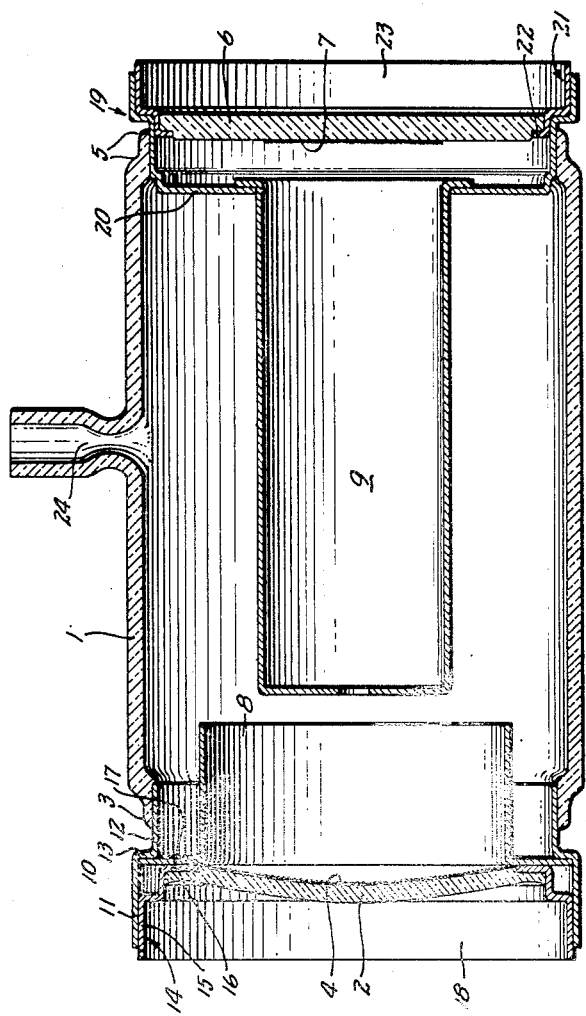
INVENTOR.
C. L. DAY
BY Philip M. Bolton
ATTORNEY

2,708,250

TUBE ASSEMBLY

Cyril L. Day, Huntington, Ind., assignor to Farnsworth Research Corporation, Fort Wayne, Ind., a corporation of Indiana Application June 5, 1952, Serial No. 291,825

9 Claims. (Cl. 313—282)

This invention relates to an electrical discharge tube assembly and particularly to the supporting of the electrodes therein and the sealing of the tube.

In mounting the electrodes of certain types of tubes and in sealing the envelope thereof, it is important to minimize the amount of heat employed especially the heating of the electrodes. Undue heating of the electrodes may introduce undesirable chemical reactions such as oxide formation etc., and may adversely mechanically affect the electrodes, the electrode assemblies or electrode supports.

In many types of tubes the electrodes are separately suspended from different parts of the envelope. It is desirable to accurately position these electrodes with respect to each other.

An object of the present invention is the provision of an electrical discharge tube assembly in which the electrodes are mounted with a minimum of heating thereof.

Another object of the present invention is the provision of an electrical discharge tube assembly in which electrodes are supported from the envelope and are accurately positioned with respect to each other by relatively simple means.

According to one aspect of the present invention an electrode is mounted by clamping an extension of the electrode between two metallic members which are fastened together, for example by welding, one of said metallic members being sealed to the envelope.

According to a further aspect of the present invention an extension of the electrode to be mounted is clamped between two rings which are fastened together, at least one of said rings being made of a metal having substantially the same coefficient of expansion as glass and being sealed to the glass envelope, the two rings being fastened together, for example by seam welding.

The above-mentioned and other features and objects of this invention and the manner of attaining them will become more apparent and the invention itself will be best understood, by reference to the following description of an embodiment of the invention taken in conjunction with the accompanying drawings, wherein, the figure is a longitudinal sectional view of an electrical discharge device.

Referring now to the figure, the device illustrated is an image convertor tube in which an infrared light image is converted into a corresponding visible light image.

The envelope of the tube includes a glass cylinder 1 with a circular glass blank 2 towards one end 3 thereof on the inside of which the cathode 4, in the form of a film, is formed, the blank 2 being attached to the glass cylinder 1 in a manner hereinafter described. Near the other end 5 of glass cylinder 1 there is provided a glass window 6 whose interior side is coated with phosphors 7 to produce a visible image when struck by the electrons emitted from cathode 4. Accelerating electrodes 8 and 9 are supported within glass cylinder 1 towards opposite ends 3 and 5 thereof.

To support the glass blank 2, the electrode 8, and to close the glass cylinder 1 at the end 3 thereof, the following arrangement is employed in accordance with the present invention.

A metallic ring 10 is provided having an outer cylindrical portion 11 of a given diameter, an inner cylindrical portion 12 of somewhat smaller diameter, the two portions being joined by an annular, radial portion 13. End 3 of glass cylinder 1 is sealed to cylindrical portion 12. A second ring 14 is provided having a cylindrical portion 15 which nests within cylindrical portion 11 of ring 10. Ring 14 is also provided with an annular portion 16 to which the glass window 2 is sealed. The electrode 8 is provided with an annular extension 17 which fits snugly within cylindrical portion 11 of ring 10 and rests against the annular portion 13 of ring 10, being clamped between this and the flange portion 16 of ring 14, rings 10 and 14 being seam welded together as indicated at 18 in their cylindrical portions 11 and 15 respectively. In the construction of the tube at the end 3 thereof, ring 10 is sealed to end 3 of glass cylinder 1 while in a separate operation glass window 2 is fixed to ring 14. Then in assembling the parts, electrode 8 is inserted within ring 10, and ring 14 together with its glass window 2 is next inserted within ring 10, the rings being forced together to grip extension 17 of electrode 8. Finally the two rings are seam welded together. Since the seam welding is done at much lower temperatures than is required, to seal the glass to the rings, it will be seen that the final operation does not heat the electrodes. With respect to the prior operations of sealing the glass to the rings, the electrodes may be cleaned and otherwise suitably treated after such glass sealing and thereafter they are not subjected to the same amount of heat in the seam welding process and thereby no undesirable chemical reactions are introduced in the assembly step.

In mounting electrode 9 and glass window 6, a somewhat different arrangement is employed. A ring 19 is sealed to the glass cylinder 1 at the end 5 thereof. Ring 19 is provided with a flange portion 20 to which the electrode 9 is welded. In a separate operation a ring 21 having a flange portion 22 has the window 6 sealed to the flange portion 22. The ring 21 is then inserted within ring 19 and fits snugly therein, the ring 21 is then seam welded as indicated at 23 to ring 19 thereby closing the tube.

For the purpose of introducing various gases and for the purposes of evacuating the tube, the customary glass tubulation 24 may be formed on the glass cylinder 1. This tubulation is tipped off after the tube has been evacuated to provide a hermetically sealed tube.

Rings 14, 10, 18 and 19 are preferably made of a metal having substantially the same coefficient of expansion as the glass cylinder 1, and may be for example made of "Kovar."

While there is described one embodiment of my invention in connection with a specific tube structure, it is apparent that it applies to many tube structures and that numerous changes may be made without departing from the invention. For example, instead of supporting individual electrodes in the manner described, an entire electrode assembly, such as an electron gun, may be supported between two members from the envelope of a tube by gripping an extension of such assembly between rings or other members at least one of which members is sealed to the envelope. Numerous other changes could likewise be made within the teachings of the present invention depending upon the specific type of tube being constructed.

While I have described above the principles of my invention in connection with specific apparatus, it is to be clearly understood that this description is made only by way of example and not as a limitation to the scope of my invention.

What I claim is:

1. An electrical discharge tube assembly comprising an envelope, an electrode, an extension from said electrode, a first cylindrical member sealed to said envelope, a second cylindrical member fastened to said first member to provide a single cylindrical terminal portion, said extension lying between and being gripped by a portion of said first and second members to secure said electrode against movement in one direction, said extension further engaging said first member at a point to prevent movement of said electrode in a direction transversely of said one direction to thereby hold the electrode in position with respect to said envelope, said terminal portion projecting outwardly from said envelope sufficiently such that no tube assembly structure is disposed radially inwardly of said terminal portion.

2. An assembly according to claim 1 wherein said envelope is ceramic and said first member is made of a conductive material having substantially the same coefficient of expansion as said ceramic.

3. An assembly according to claim 2 wherein said envelope is cylindrical, said first member is a ring having two cylindrical portions extending from opposite edges of a flat annular radial portion thereof, one of said cylindrical portions being sealed to the envelope and the other cylindrical portion extending axially of the envelope, said extension lying against said flat portion and fitting closely within the other cylindrical portion of said first member, and said second member comprises a second metallic ring having a cylindrical portion and an annular flange pressed against the side of the extension opposite the side against the flat portion of said first mentioned ring to thereby grip the extension therebetween, the cylindrical portion of said second member coaxially fitting inside said other cylindrical portion, the abutting cylindrical portions of said first and second rings being welded together.

4. An assembly according to claim 3 further including a circular ceramic end wall sealed to said second ring.

5. An electrical discharge tube assembly comprising an elongated cylindrical envelope, a first cylindrical supporting element which is electrically conductive having stepped diameter end portions which provide a radial shoulder therebetween, the smaller diameter end portion being coaxially sealed to one end of said envelope, a cylindrically shaped tube electrode having a radially outwardly extending flange on one end coaxially mounted in said envelope, the outer periphery of said flange engaging the inner periphery of the large diameter end portion of said first element thereby preventing relative radial movement of said electrode, said flange further abutting against said shoulder to prevent axial movement of said electrode with respect thereto, and a second cylindrical electrically conductive supporting element having a radially inwardly extending flange, the cylindrical portion of said second element coaxially fitting inside said larger diameter portion of said first element, the second element flange engaging said electrode flange to press the latter against said shoulder.

6. An electrical discharge tube assembly comprising an elongated cylindrical envelope, a first cylindrical supporting element which is electrically conductive having stepped diameter end portions which provide a radial shoulder therebetween, the smaller diameter end portion being coaxially sealed to one end of said envelope, a cylindrically shaped tube electrode having a radially outwardly extending flange on one end coaxially mounted in said envelope, the outer periphery of said flange engaging the inner periphery of the large diameter end portion of said first element thereby preventing relative radial movement of said electrode, said flange further abutting against said shoulder to prevent axial movement of said electrode with respect thereto, a second cylindrical electrically conductive supporting element having a radially inwardly extending flange, the cylindrical portion of said second element coaxially fitting inside said large diameter portion of said first element, the second element flange engaging said electrode flange to press the latter against said shoulder, and a second tube electrode centrally mounted on the radial flange of said second element whereby it is recessed back from the outer end of the fitting cylindrical portions of both supporting elements.

7. An electrical discharge tube assembly comprising an elongated cylindrical envelope, a first cylindrical supporting element which is electrically conductive having stepped diameter end portions which provide a radial shoulder therebetween, the smaller diameter end portion being coaxially sealed to one end of said envelope, a cylindrically shaped tube electrode having a radially outwardly extending flange on one end coaxially mounted in said enevelope, the outer periphery of said flange engaging the inner periphery of the large diameter end portion of said first element thereby preventing relative radial movement of said electrode, said flange further abutting against said shoulder to prevent axial movement of said electrode with respect thereto, a second cylindrical electrically conductive supporting element having a radially inwardly extending flange, the cylindrical portion of said second element coaxially fitting inside said larger diameter portion of said first element, the second element flange engaging said electrode flange to press the latter against said shoulder, and a plate-like member serving as a tube electrode mounted on the radial flange of said second element in such a manner as to provide an electrically conductive connection therewith.

8. An assembly according to claim 7 wherein the envelope is made of an electrical-insulating material.

9. An assembly according to claim 7 wherein the fitting cylindrical portions of both supporting elements project axially outwardly from the envelope thereby providing an annular connecting terminal for coupling the tube into an electronic circuit.

References Cited in the file of this patent

UNITED STATES PATENTS

| | | |
|---|---|---|
| 2,423,066 | Gibson | June 24, 1947 |
| 2,445,992 | Beggs | July 27, 1948 |